US011440062B2

(12) United States Patent
Ferry et al.

(10) Patent No.: US 11,440,062 B2
(45) Date of Patent: Sep. 13, 2022

(54) SYSTEM AND METHOD FOR CLEANING A TUBE

(71) Applicant: General Electric Company, Schenectady, NY (US)

(72) Inventors: Allan Ferry, Windsor, CT (US); Ronald Konopacki, Suffield, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 238 days.

(21) Appl. No.: 16/676,922

(22) Filed: Nov. 7, 2019

(65) Prior Publication Data

US 2021/0138516 A1 May 13, 2021

(51) Int. Cl.
| | | |
|---|---|---|
| *B08B 9/023* | (2006.01) | |
| *B08B 7/00* | (2006.01) | |
| *B23K 26/36* | (2014.01) | |
| *F28G 13/00* | (2006.01) | |
| *F28G 15/00* | (2006.01) | |

(52) U.S. Cl.
CPC ............ *B08B 9/023* (2013.01); *B08B 7/0042* (2013.01); *B23K 26/36* (2013.01); *F28G 13/00* (2013.01); *F28G 15/003* (2013.01)

(58) Field of Classification Search
CPC ....... B08B 7/0042; B08B 9/023; B08B 9/027; B23K 26/36; F28G 13/00; F28G 15/003
See application file for complete search history.

(56) References Cited

U.S. PATENT DOCUMENTS

| | | | | |
|---|---|---|---|---|
| 2,353,125 A | * | 7/1944 | Carpmail | B08B 9/023 29/DIG. 98 |
| 4,156,949 A | * | 6/1979 | Ziegelmeyer | B08B 9/023 15/88 |
| 5,151,135 A | * | 9/1992 | Magee | H01L 21/02046 428/846.1 |
| 5,531,857 A | * | 7/1996 | Engelsberg | B23K 26/1436 134/1 |
| 5,592,879 A | * | 1/1997 | Waizmann | B23K 26/0648 134/1 |
| 5,643,472 A | * | 7/1997 | Engelsberg | B23K 26/1436 219/121.84 |
| 5,662,145 A | * | 9/1997 | Stagg | B23K 33/004 138/171 |

(Continued)

FOREIGN PATENT DOCUMENTS

| | | |
|---|---|---|
| CN | 107234106 A | 10/2017 |
| CN | 110813934 A | 2/2020 |

(Continued)

OTHER PUBLICATIONS

International Search Report from corresponding PCT Patent Application No. PCT/US2020/057698 dated Feb. 16, 2021.

*Primary Examiner* — Duy Vu N Deo
*Assistant Examiner* — Christopher Remavege
(74) *Attorney, Agent, or Firm* — Grogan, Tuccillo & Vanderleeden, LLP

(57) ABSTRACT

A system for cleaning a tube is provided. The system includes an enclosure, a laser, and an actuator. The enclosure receives the tube. The laser is disposed within the enclosure and operative to ablate a substance disposed on a surface of the tube. The actuator is operative to move the tube relative to the laser.

14 Claims, 7 Drawing Sheets

(56) References Cited

U.S. PATENT DOCUMENTS

| | | | | |
|---|---|---|---|---|
| 5,736,709 | A * | 4/1998 | Neiheisel | B23K 26/123 219/121.75 |
| 5,780,806 | A * | 7/1998 | Ferguson | B08B 7/0042 134/1 |
| 6,158,074 | A * | 12/2000 | Castille | B08B 9/0436 15/104.04 |
| 8,257,637 | B2 * | 9/2012 | Okada | B08B 9/023 264/156 |
| 8,766,140 | B2 * | 7/2014 | Denney | B23K 9/235 219/136 |
| 9,457,432 | B2 | 10/2016 | Denney | |
| 9,914,985 | B2 * | 3/2018 | Dajnowski | B23K 26/355 |
| 11,047,017 | B2 * | 6/2021 | Dajnowski | C21D 1/34 |
| 2005/0150522 | A1 * | 7/2005 | Okada | B08B 9/023 134/1 |
| 2009/0272722 | A1 * | 11/2009 | Sbetti | B08B 7/0042 219/121.6 |
| 2014/0021177 | A1 * | 1/2014 | Koch | B23K 26/04 219/121.69 |
| 2014/0230558 | A1 * | 8/2014 | Grafton-Reed | G01N 29/2418 73/655 |
| 2014/0263200 | A1 | 9/2014 | Denney | |
| 2014/0305907 | A1 * | 10/2014 | Sprentall | B23K 26/0626 219/69.1 |
| 2015/0190884 | A1 * | 7/2015 | Roy | G01J 3/443 250/288 |
| 2016/0067824 | A1 * | 3/2016 | Dajnowski | B23K 26/082 219/121.64 |
| 2016/0263629 | A1 | 9/2016 | Hagedorn et al. | |
| 2016/0339487 | A1 * | 11/2016 | Higgins | B23K 26/0006 |
| 2017/0122805 | A1 * | 5/2017 | Day | B23K 26/0006 |
| 2017/0189945 | A1 * | 7/2017 | LeClaire | B08B 7/0042 |
| 2017/0326685 | A1 | 11/2017 | Kell et al. | |
| 2018/0117661 | A1 * | 5/2018 | Konopacki | B21D 53/06 |
| 2018/0251865 | A1 * | 9/2018 | Dajnowski | C21D 1/34 |
| 2019/0030578 | A1 * | 1/2019 | McRaney | B23K 26/36 |
| 2019/0033231 | A1 * | 1/2019 | Connell | H05H 1/0037 |
| 2021/0343441 | A1 * | 11/2021 | Ahn | B23K 26/082 |

FOREIGN PATENT DOCUMENTS

| | | |
|---|---|---|
| EP | 1899082 A1 | 3/2008 |
| EP | 2516100 A1 | 10/2012 |
| EP | 2516100 B1 | 5/2015 |
| EP | 1899082 B1 | 8/2016 |
| EP | 3077571 A1 | 10/2016 |
| EP | 3077571 B1 | 10/2017 |
| WO | 2006136669 A1 | 12/2006 |
| WO | 2011076844 A1 | 6/2011 |
| WO | 2013050855 A2 | 4/2013 |
| WO | 2013050855 A3 | 7/2013 |
| WO | 2015082993 A1 | 6/2015 |
| WO | 2018080655 A1 | 5/2018 |

* cited by examiner

SYSTEM AND METHOD FOR CLEANING A TUBE

BACKGROUND

Technical Field

Embodiments of the invention relate generally to the manufacturing of boiler components, and more specifically to a system and method for cleaning a tube.

Discussion of Art

Most tubing/piping used in boiler fabrication, e.g., manufacturing of heating elements such as waterwalls, jumper tubes, inserts and/or header nipples, requires cleaning of the outside surface of the tubing prior to use in one or more fabrication processes, e.g., welding, bending, swaging, bifurcation, etc. In particular, most tubing is stored in outside lots/yards located at and/or near the site of boiler fabrication. Many tubes stored in such conditions will accumulate rust, dirt and/or other substances which can negatively affect a boiler fabrication process. While some manufacturers of tubing coat the surfaces of the tubing with a protective substance, e.g., oil and/or wax, many such substances can also negatively affect a boiler fabrication process.

One common approach for cleaning tubing prior to use in a boiler fabrication process is blasting, which generally involves propelling small granules of metal, sand, or other hard and/or abrasive substance, at the surface of the tubing via compressed air or other medium. Blasting, however, typically requires end caps to be manually installed on and removed from the open ends of a segment of tubing to mitigate the chance the granules will enter the interior of the tubing segment. Manually installing and removing end caps, however, is a time-consuming process. Further, blasting also often removes all material identification information from the tubing.

What is needed, therefore, is an improved system and method for cleaning a tube.

BRIEF DESCRIPTION

In an embodiment, a system for cleaning a tube is provided. The system includes an enclosure, a laser, and an actuator. The enclosure receives the tube. The laser is disposed within the enclosure and operative to ablate a substance disposed on a surface of the tube. The actuator is operative to move the tube relative to the laser.

In another embodiment, a method for cleaning a tube is provided. The method includes receiving the tube at an enclosure; moving the tube within the enclosure relative to a laser via an actuator, and ablating a substance disposed on a surface of the tube via the laser.

In yet another embodiment, a system for cleaning a tube is provided. The system includes a laser disposed within an enclosure and operative to ablate a substance disposed on an exterior surface of the tube; and a conveyor having at least two drive wheels operative to effect movement of a point on the exterior surface in a spiral direction relative to the laser so that the laser removes the substance off of a majority of the exterior surface.

DRAWINGS

The present invention will be better understood from reading the following description of non-limiting embodiments, with reference to the attached drawings, wherein below:

DETAILED DESCRIPTION

Figure 1:
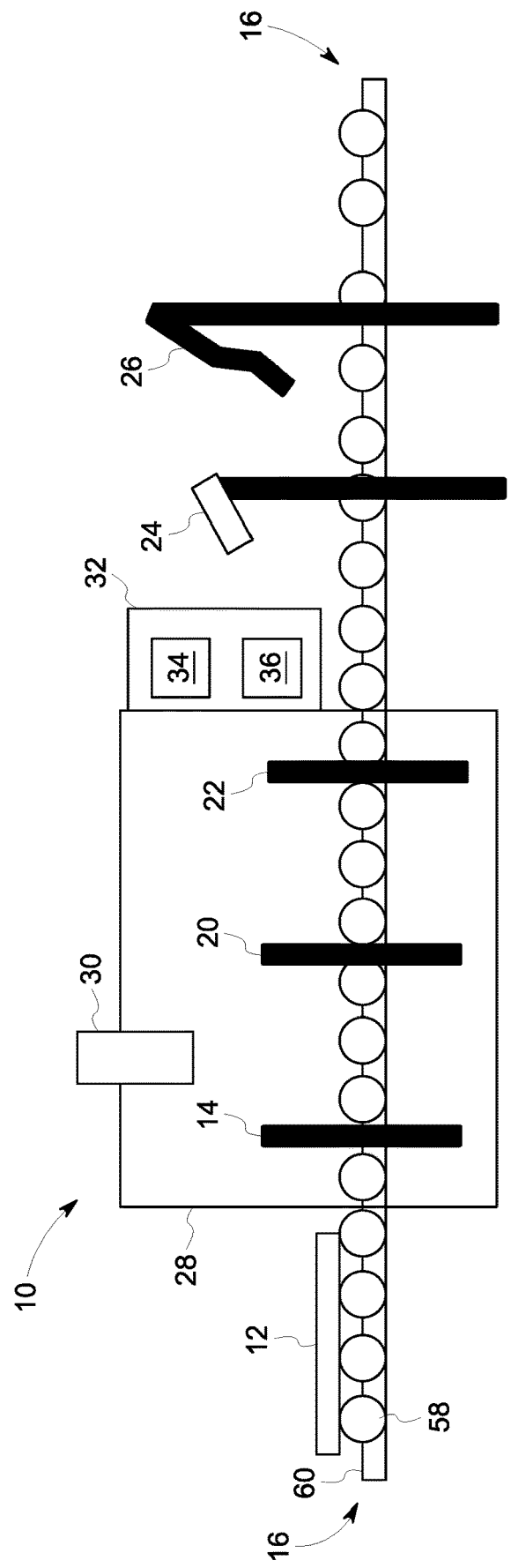
FIG. 1 is a schematic diagram depicting a side profile of a system for cleaning a tube, in accordance with an embodiment of the present invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As also used herein, the terms "upstream" and "downstream," describe the position and/or order of elements on, and/or stages of, an assembly line/conveyor system with respect to a direction that defines the order an object traveling through the assembly line/conveyor system encounters the elements and/or stages. As also used herein, the term "heating contact" means that the referenced objects are in proximity of one another such that heat/thermal energy can transfer between them. As used herein, "electrically coupled," "electrically connected," and "electrical communication" mean that the referenced elements are directly or indirectly connected such that an electrical current, or other communication medium, may flow from one to the other. The connection may include a direct conductive connection, i.e., without an intervening capacitive, inductive or active element, an inductive connection, a capacitive connection, and/or any other suitable electrical connection. Intervening components may be present. The term "real-time", as used herein, means a level of processing responsiveness that a user senses as sufficiently immediate or that enables the processor to keep up with an external process. Additionally, the term "clean", as used herein with respect to a substance on a surface of a tube and/or pipe, means to remove the substance from the surface.

Additionally, while the embodiments disclosed herein are primarily described with respect to cleaning tubing used in a boiler fabrication process similar to the one disclosed in U.S. patent application Ser. No. 15/335,867, which is herein incorporated by reference in its entirety, it is to be understood that embodiments of the invention may be applicable to any application that requires a tube and/or other object to be cleaned of a substance.

Figure 2:
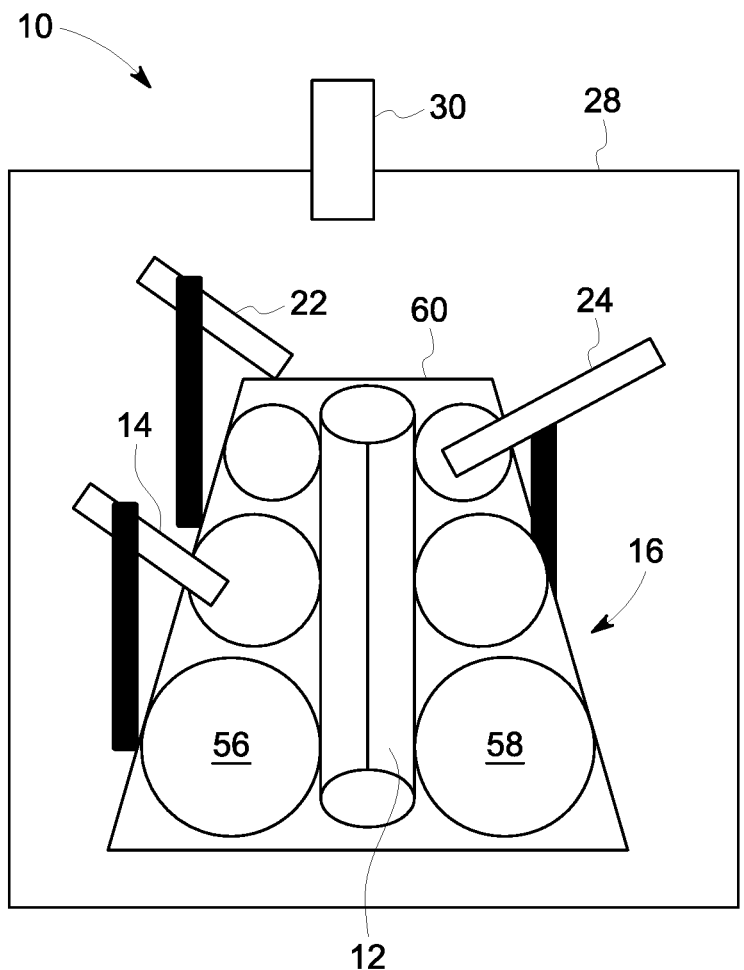
FIG. 2 is a schematic diagram depicting an elevated frontal view of the system of FIG. 1, in accordance with an embodiment of the present invention.

Referring now to FIGS. 1 and 2, a system 10 for cleaning a tube/pipe 12 is shown in accordance with an embodiment of the present invention. In embodiments, the system 10 includes a laser 14 (best seen in FIGS. 2 and 7) and an actuator 16. As will be explained in greater detail below, the laser 14 is operative to ablate a substance 18 (best seen in FIGS. 4 and 7) disposed on a surface of the tube 12, and the actuator 16 is operative to move the tube 12 relative to the laser 14. As used herein, the term "relative" with respect to movement of the tube 12 and laser 14 means relative motion between the laser 14 and the tube 12, e.g., the tube 12 may move while the laser 14 remains stationary or the laser 14 may move while the tube 12 remains stationary. In embodiments, the system 10 may further include a probe 20, one or more sensors 22 and 24, a marking device 26, a containment apparatus/enclosure 28, a vent 30, and/or a controller 32 having at least one processor 34 and/or a memory device 36.

Figure 3:
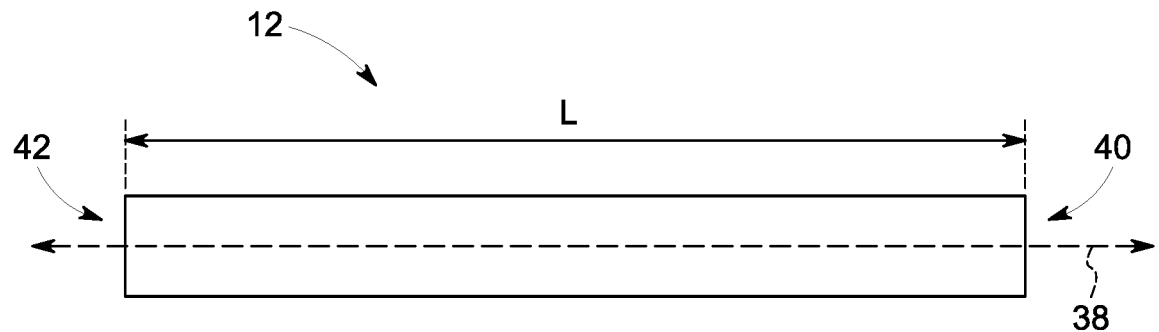
FIG. 3 is a schematic diagram depicting a side profile view of a tube for use in the system of FIG. 1, in accordance with an embodiment of the present invention.
Figure 4:
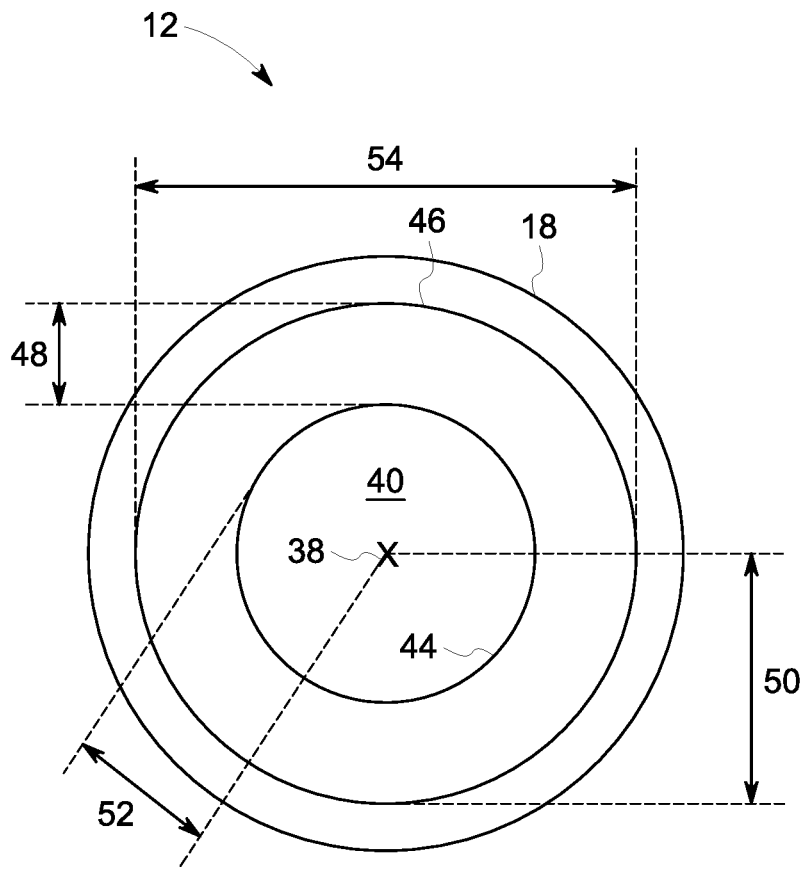
FIG. 4 is a schematic diagram depicting a frontal view of the tube of FIG. 3, in accordance with an embodiment of the present invention.

Turning briefly to FIGS. 3 and 4, in embodiments, the tube 12 has a longitudinal axis 38 and one or more openings 40 and 42 that define a length L. As shown in FIG. 4, the tube 12 has an interior/inner surface 44 and an exterior/outer surface 46. As described above, prior to being processed by the system 10, the tube 12 may have accumulated the substance 18, e.g., oxidation (e.g., rust), mill scale, a protective coating, etc. While FIG. 4 depicts the substance 18 as disposed on the exterior surface 46, it will be understood that the substance 18 may also be disposed on the interior surface 44. As further shown in FIG. 4, the tube 12 has a wall thickness 48 defined by the difference between an exterior radius 50 and an inner radius 52 of the tube 12. The tube 12 also has a diameter/width 54. In embodiments, the tube 12 may be made of various substances to include but not limited to iron, copper, tin, lead, alloys thereof, plastics and/or carbon fiber.

Figure 5:
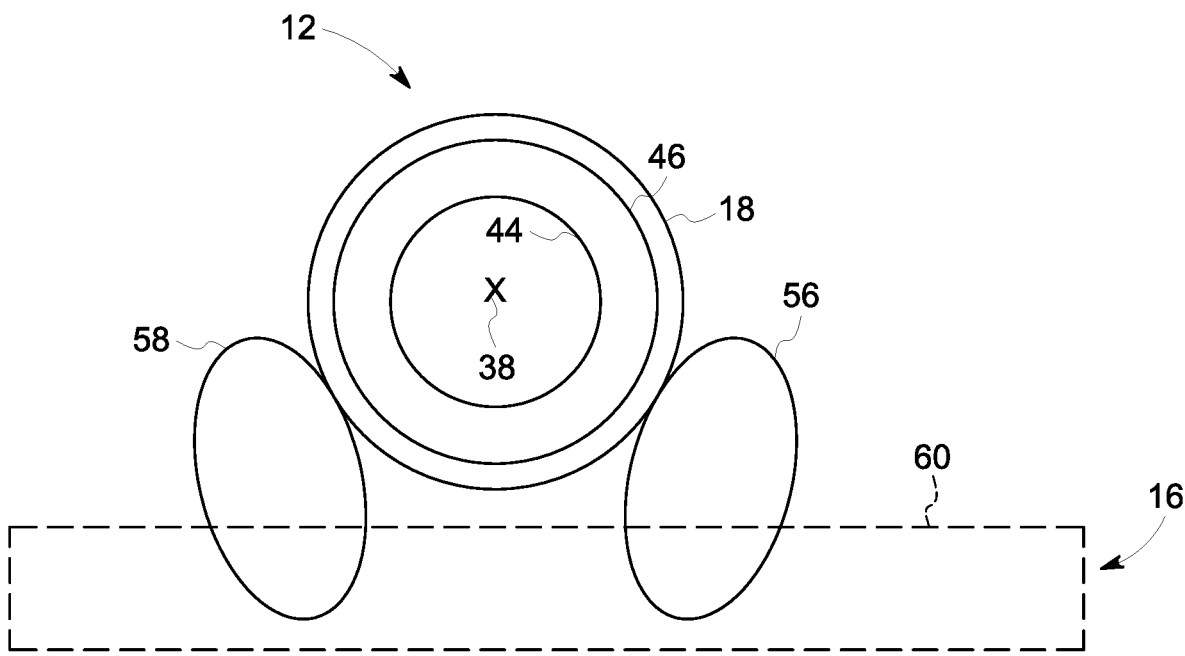
FIG. 5 is a schematic diagram depicting an actuator of the system of FIG. 1, in accordance with an embodiment of the present invention.
Figure 6:
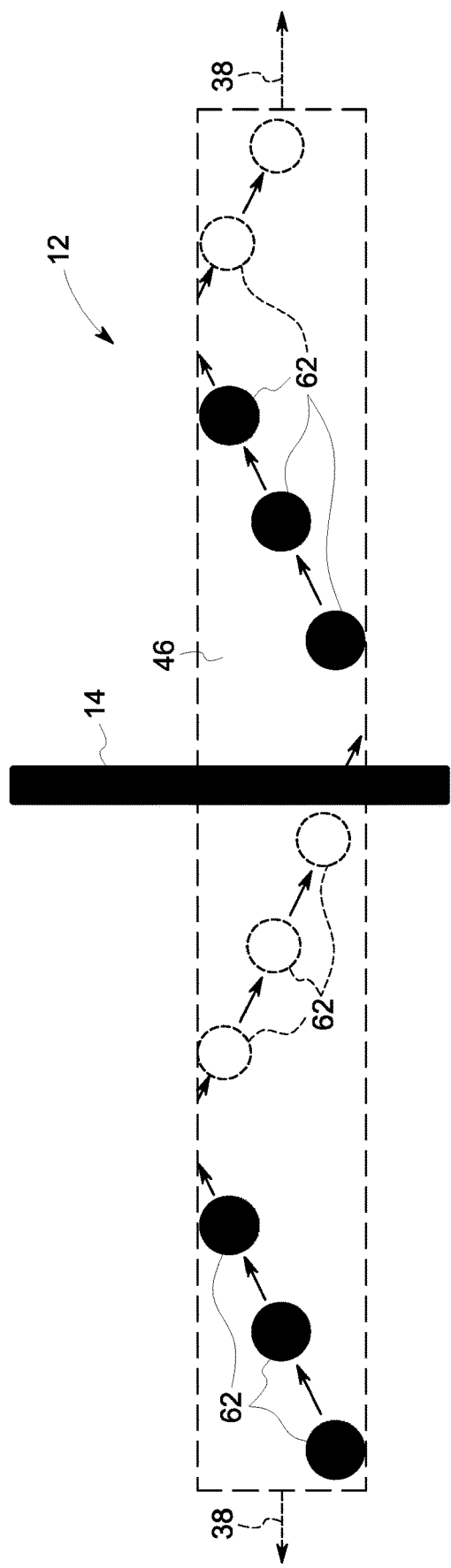
FIG. 6 is a schematic diagram depicting a spiral motion of a tube as effected by the actuator of FIG. 5, in accordance with an embodiment of the present invention.

Returning back to FIGS. 1 and 2, in embodiments, the actuator 16 may be a conveyor having at least two drive wheels 56 and 58 which may be mounted to a support structure 60. Referring briefly to FIGS. 5 and 6, in such embodiments, the drive wheels 56 and 58 (FIG. 5) may be operative to effect movement of a point 62 (FIG. 6) disposed on the exterior surface 46 in a spiral direction relative to the laser 14 (FIGS. 1, 2 and 6). For example, in embodiments, the drive wheels 56 and 58 may be inclined with respect to the support structure 60 and/or rotate in the same (or different) directions from each other so as to effect a forward movement and/or a rotation of the tube 12 about the tube's 12 longitudinal axis 38. As will be understood, the point 62 is shown in FIG. 6 as solid and dashed spheres where the solid spheres indicate the point 62 is on a side of the tube 12 facing out of the drawing sheet and where the dashed spheres indicate the point 62 is on the side of the tube 12 facing into the drawing sheet. Further, it will be understood that the tube 12 is depicted in FIG. 6 with a dashed border to indicate the boundaries of the spiral path of the point 62 as the tube 12 is moved by the conveyor 16. In other words, while FIG. 6 appears to show the point 62 moving along the tube 12, it is to be understood that the point 62 moves with the tube 12 and that the depicted spiral path of the point 62 is the result of the rotation of the tube 12 about its longitudinal axis 38 as the tube 12 is moved toward the laser 14 by the conveyor 16. In other words, FIG. 6 depicts the movement of the point 62 relative to the laser 14.

Figure 7:
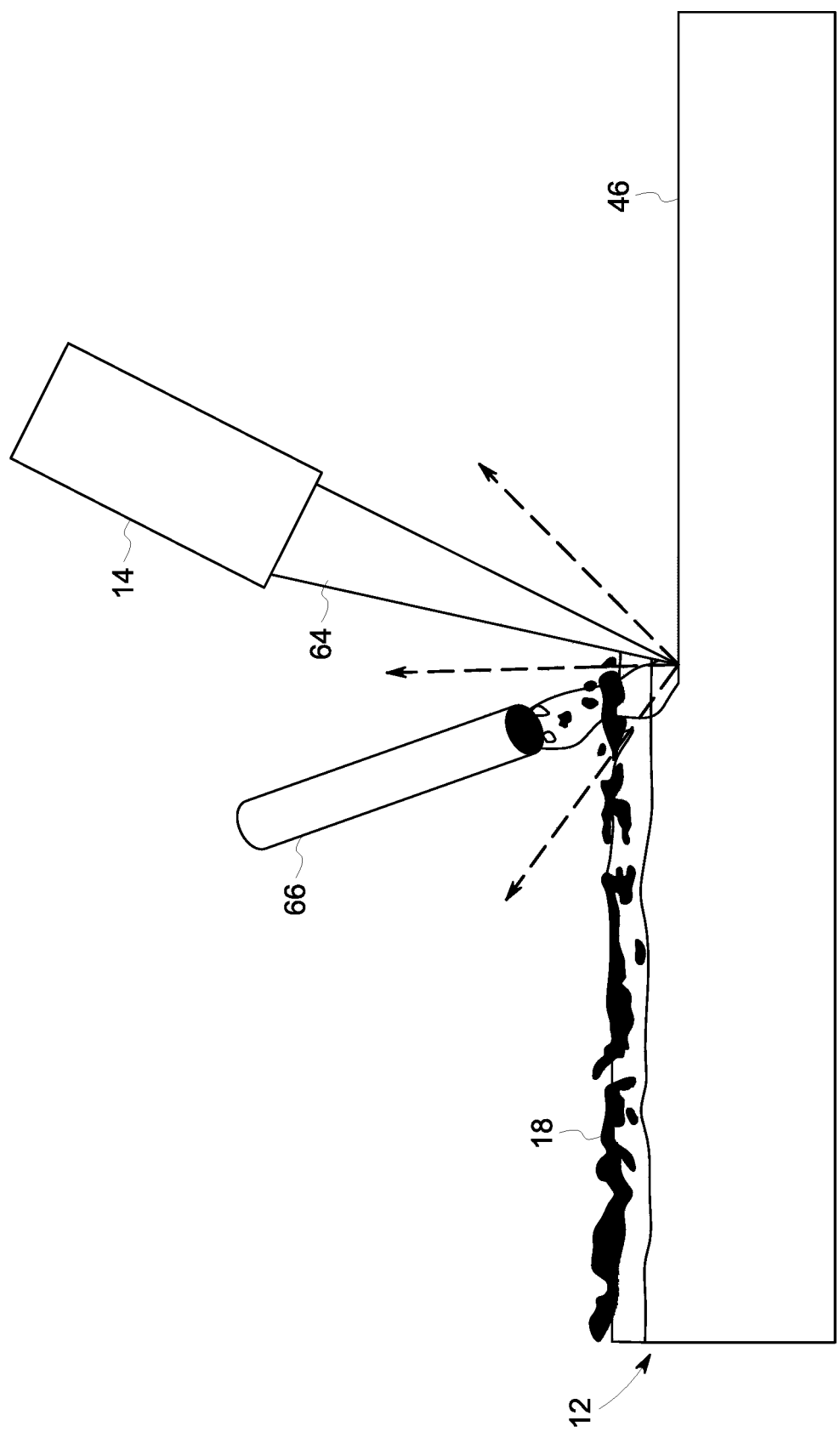
FIG. 7 is a schematic diagram depicting the ablation of a substance on a tube by a laser of the system of FIG. 1, in accordance with an embodiment of the present invention.

Turning to FIG. 7, in embodiments, the laser 14 ablates the substance 18 by directing a beam/energy 64 against the exterior surface 46 of the tube 12 such that a substantial portion of the beam 64 is absorbed by the substance 18, which in turn, may cause the substance 18 to vaporize and/or transform into a plasma. As will be appreciated, the vaporization and/or transformation of the substance 18 into a plasma may create shockwaves that crack and/or decompose the substance 18 on the surface 46 of the tube 12. As will be further appreciated, in embodiments where the tube 12 is made of a reflective material, e.g., copper, the beam 64 is prevented from ablating portions of the tube 12 underneath the layered substance 18 as the reflective property of the tube 12, once the substance 18 has been cleaned off the tube 12, disperses and/or reflects the beam 64. In other words, in embodiments, the laser 14 only ablates the substance 18. As such, in embodiments, the laser 14 may generate a beam 64 having a width of about four (4) inches and/or a substance 18 removal rate of about thirty (30) sec/ft2. Accordingly, in some embodiments, the laser 14 may be in the 1000-watt category and/or in the ultraviolet or infrared wavelengths. As will be understood, however, in embodiments where the tube 12 is made of a non-reflective material, other controls may be utilized to determine when to stop the beam 64 from damaging the tube 12, e.g., a material detector may determine when the beam 64 has begun ablating portions of (material forming) the tube 12, as opposed to merely ablating the substance 18 on the exterior of the tube 12.

In embodiments, the system 10 may further include a suction device 66 disposed at and/or near the point of contact between the beam 64 and the tube 12 and operative to suck up the vaporized substance 18 and/or plasma.

While the foregoing example disclosed a spiral movement of the tube 12 with respect to the laser 14, it will be understood that other embodiments may utilize other movements. For example in embodiments, the actuator 16 may move the tube 12 relative to the laser 14 back and forth, e.g., brush strokes used for painting the side of a house. Further, while the actuator 16 moved the tube 12 in the foregoing example, it will be understood that, in other embodiments, the actuator 16 may move the laser 14, e.g., the actuator 16 may be one or more mobile arms capable of accessing all portions of the tube 12 to which the laser 14, probe 20, sensor 22 and 24 and/or marking device 26 are mounted to.

Returning back to FIGS. 1 and 2, in embodiments, the laser 14 may be disposed within the containment apparatus 28 which prevents vaporized and/or ablated substance 18, not captured by suction device 66, from entering the surrounding atmosphere. As shown in FIG. 1, the vent 30 is disposed in the containment apparatus 28 and is operative to vent/direct the vaporized 18 substance away from the immediate surroundings and/or to a processing device for treatment and/or storage of the vaporized substance 18. In embodiments, the containment apparatus 28 may be a hermetically sealed chamber. In certain aspects of the invention, a single tube 12 segment may be loaded into the containment apparatus 28 at a time, e.g., the system 10 processes one (1) tube 12 at a time. In other embodiments, however, the system 10 may process multiple tube 12 segments together.

In embodiments, the probe 20 may be operative to identify one or more materials that the tube 12 is made of. For example, in embodiments, the probe 20 may be a laser induced breakdown spectroscopy ("LIBS") device which uses short laser pulses to create a micro plasma from the material being analyzed. As will be understood, the plasma emits light with distinct spectral peaks which can be assessed by an ICCD/spectrograph detector to identify one or more materials forming the plasma. In embodiments, the probe 20 may be an x-ray fluorescence ("XRF") device.

In embodiments where the probe 20 is a laser induced breakdown spectroscopy device, the laser 20 may be disposed downstream of the laser 14 such that the laser 20 is able to vaporize a small amount of the surface 46 after having been recently cleaned of the substance 18 by the laser 14. In embodiments, the probe 20 may also be disposed within the containment apparatus 28.

In embodiments, at least one of the sensors 22 and 24 may be operative to measure the wall thickness 48 (FIG. 4), the inner 52 and/or exterior 50 radii, the length L of the tube 12, a hardness of the tube 12 (e.g., verification of tempered ferritic alloys) and/or other properties of the tube 12. In such embodiments, the sensors 22 and 24 may include an ultrasonic sensor, an eddy current sensor, a radiological sensor, and/or an optical camera. In embodiments, the sensors 22 and/or 24 may be disposed inside the containment apparatus 28, e.g., sensor 22, and/or disposed outside the containment apparatus 28, e.g., sensor 24. In embodiments, a medium, i.e., a water bath and/or a gel, may be used in conjunction with the ultrasonic sensor to improve transmission of the sound waves through the tube 12. In such embodiments, a dispenser may dispense gel and/or a liquid onto the surface of the tube 12 so as to couple the sensor 24 to the surface of the tube 12.

As yet further shown in FIG. 1, the marking device 26 may be operative to mark the tube 12, after having been cleaned by the laser 14, with one or more marks that correspond to property information, i.e., information about properties of the tube 12, e.g., a material that the tube 12 is made of, the wall thickness 48 of the tube 12, the interior 52 and/or exterior 50 radii of the tube 12, a length L of the tube 12, the hardness of the tube 12, the vendor/manufacturer of the tube 12, PO number, heat number, shop order number, lot number, tracking number an intended use of the tube, e.g., waterwall, etc., and/or other properties. In embodiments, the marking device 26 may include a laser inkjet (and/or any type of inkjet), a dot peen marker, a thermal transfer overprinter ("TTO"), print-and-apply labelling, laser marker, and/or other device capable of imprinting the information about the properties of the tube 12 onto the tube 12. In embodiments, the property information may be in the form of a one-dimensional (1D) and/or two-dimensional (2D) bar code, a serial number, human readable text and/or other forms of encoding. In embodiments, the marking device 26 may repeat the marks at pre-defined distances on the tube 12 along the longitudinal axis 38 to increase the chance that at least one mark will remain on a given section of the tube 12 in the event that the tube 12 is cut. In embodiments, the marking device 26 may be disposed on a mobile arm as shown in FIG. 1.

In operation, in accordance with an embodiment of the present invention, the tube 12 is loaded onto the actuator 16 and any end caps covering/plugging the openings 40 and 42 (not already removed) may be removed. The actuator 16 then moves the tube 12 relative to the laser 14, e.g., towards the laser 14 while rotating the tube 12 about the longitudinal axis 38, i.e., the tube 12 moves in a spiral motion towards the laser 14 like an (American) football in a forward pass. As the tube 12 passes by the laser 14, the laser beam 64 generated by the laser 14 cleans the exterior surface 46 of the tube 12 by ablating just the substance 18. The vaporized substance 18 is then sucked up by the suction device 66 and/or the vent 30. As the tube 12 continues down the actuator 16, the probe 20 includes a device, e.g., a laser and/or an XRF device, to test the recently cleaned portion of the surface 46 to determine the material of which the tube 12 is made of. Sensors 22 and/or 24 may then determine/verify the wall thickness, length, and/or other properties as discussed above, of the tube 12. The marking device 26 may then imprint marks onto the tube 12 to convey the property information of the tube as gathered/determined by the probe 20 and/or sensors 22 and 24.

Further, while FIGS. 1 and 2 show the tube 12 as fitting within the containment apparatus 28, i.e., the containment apparatus 28 is longer than the tube 12, it will be understood that, in embodiments, the containment apparatus 28 may be shorter than the tube 12. In other words, in embodiments, the containment apparatus 28 may be operative to seal and process only a portion of the tube 12 at any particular moment in time, e.g., the containment apparatus 28 may incrementally process sub-lengths of the tube 12.

Figure 8:
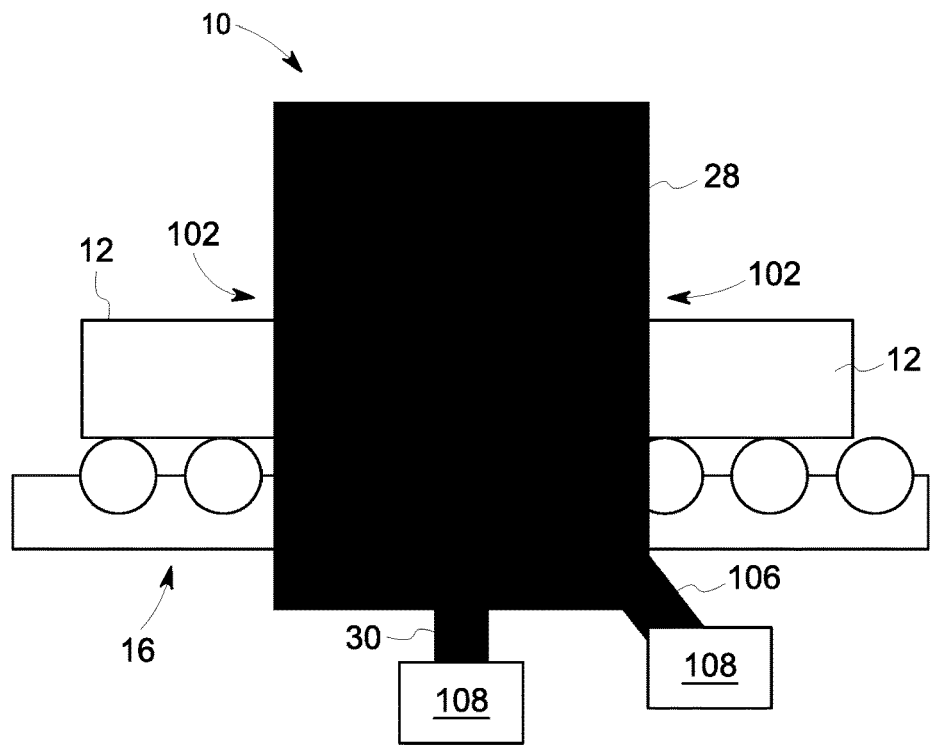
FIG. 8 is a schematic diagram depicting a side profile of another embodiment of the system of FIG. 1, in accordance with an embodiment of the present invention.
Figure 9:
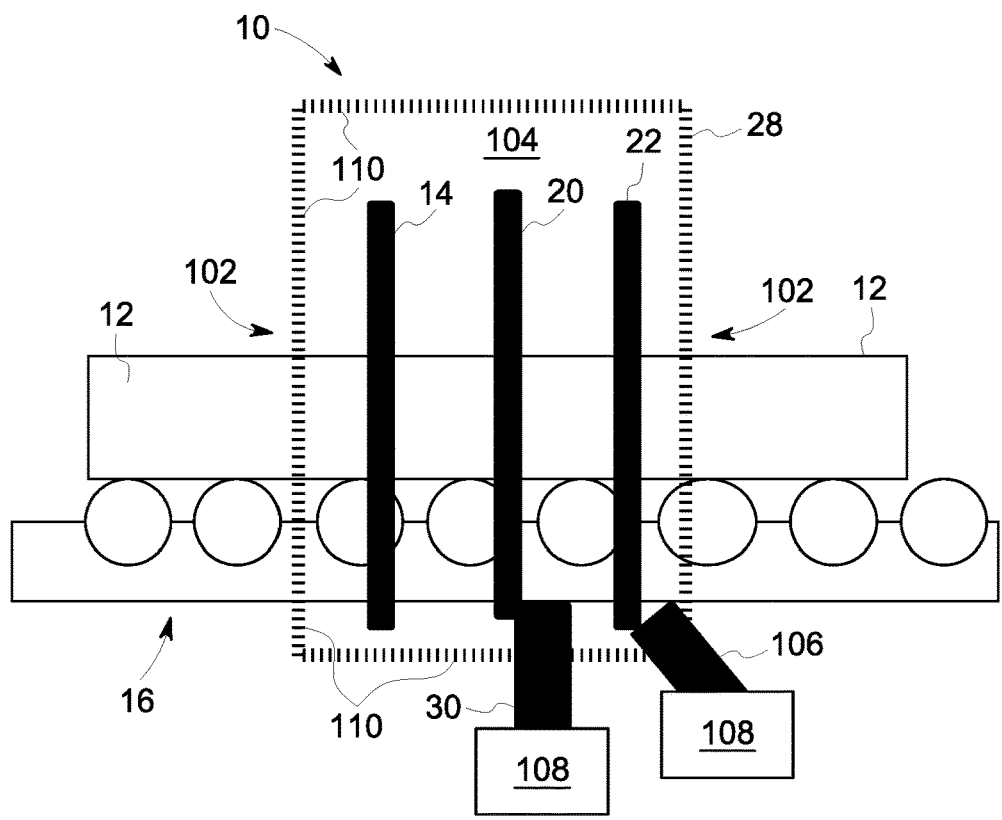
FIG. 9 is another schematic diagram depicting a side profile of the system of FIG. 8, in accordance with an embodiment of the present invention.
Figure 10:
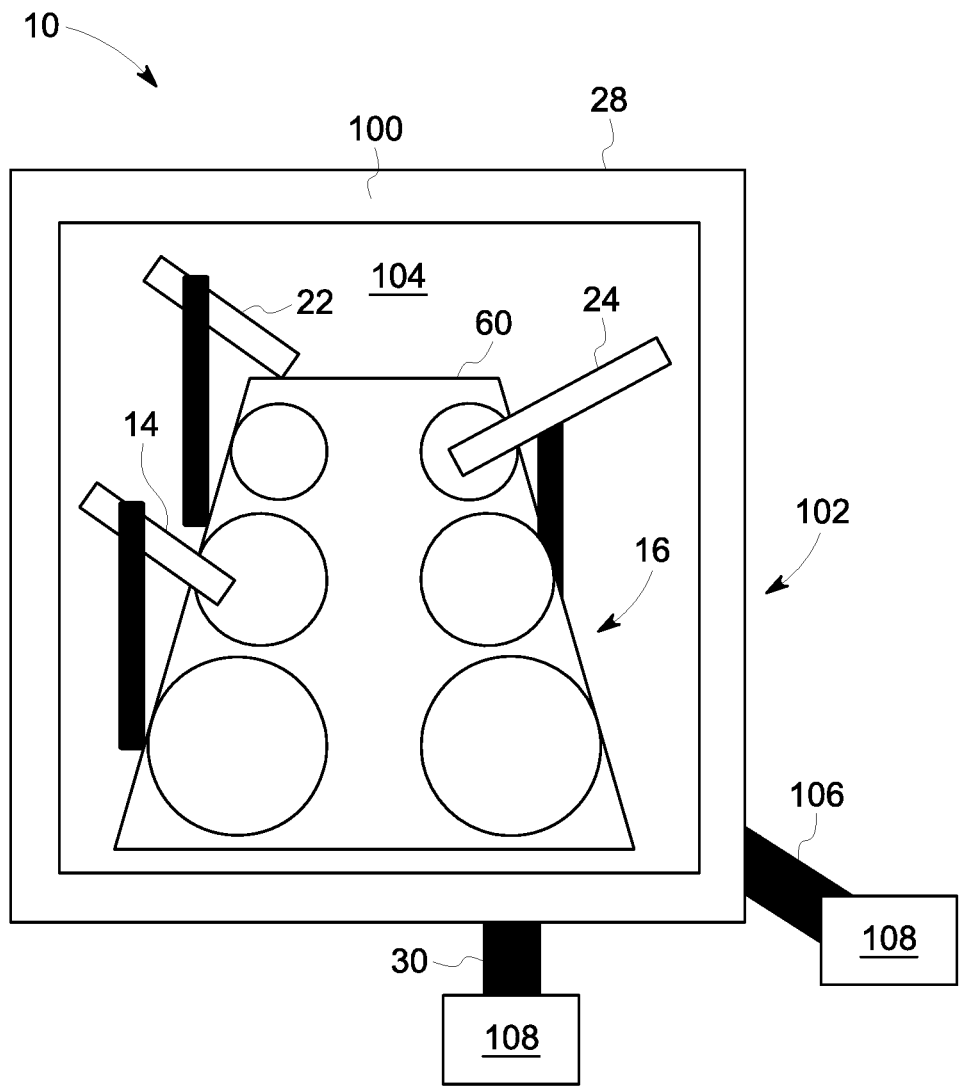
FIG. 10 is a schematic diagram depicting an elevated frontal view of the system of FIG. 8, in accordance with an embodiment of the present invention.

For example, referring now to FIGS. 8-10, an embodiment of the system 10 wherein the enclosure/containment apparatus 28 is shorter than the longitudinal length of the tube 12 is shown. As will be understood, the apparatus 28 has been drawn in dashed lines in FIG. 9 to provide for viewing of its interior 104, and the tube 12 has been omitted from FIG. 10 to improve clarity. In such embodiments, the apparatus 28 may have one or more seals 100 (FIG. 10), e.g., rubber and/or plastic guards, disposed around the openings 102 which the tube 12 passes through. As will be appreciated, the seals 100 may contact the tube 12 so as to create an environmental seal between the interior 104 (best seen in FIG. 9) of the enclosure 28 and the external environment. As will be understood, in embodiments, the seals 100 may restrict air flow between the interior 104 of the apparatus 28 and the external environment. In some embodiments, the seals 100 may restrict air flow between the exterior surface of the tube 12 and the border of the openings 102. In embodiments, the seals 100 may be rectangular, curved and/or anther shape that generally conforms to the shape of the openings 102 and/or the tube 12.

As further shown in FIGS. 8-10, the vent 30 may be disposed on a side of the tube 12 generally opposite the point at which the laser beam 64 contacts the tube 12. As will be understood, in embodiments, the positioning of the vent 30 in such a manner may restrict the beam 64 from exiting the interior 104, which in turn, may reduce the risk that the beam 64 will unintentionally contact persons and/or objects exterior to the apparatus 28.

As yet further shown in FIGS. 8-10, in embodiments, the apparatus may have a pressure control conduit 106 which may introduce and/or remove air to pressurize and or create a vacuum within the interior 104 of the apparatus 28 with respect to the surrounding environment. As will be understood, the pressure control conduit 106 may be used with (or without) the vent 30 and/or the suction device 66 to control the flow and/or removal of the vaporized substance 18 within and/or from the interior 104 of the apparatus 28. Accordingly, in embodiments, the vent 30, suction device 66 and/or the pressure control conduit 106 may include one or more filters 108 operative to filter out the vaporized substance 18. Further, in embodiments, the filtered air may be used for subsequent cooling of the laser 14, the tube 12, and/or the interior 104 of the apparatus 28. Further, in embodiments wherein a vacuum is created within the interior 104, the seals 100 may be slightly smaller than the spacing between the tube 12 and the openings 102 so as to allow air from the external environment to flow into the interior 104 of the apparatus 28, which in embodiments, may serve to restrict flow of the vaporized substance 18 out of the interior 104 and into the external environment. In other words, the flow of air through the openings 102 and into the interior 104 of apparatus 28 prevents/restricts the vaporized substance 18 from leaving the apparatus 28 in an uncontrolled and/or undesired manner.

Additionally, as best seen in FIG. 9, in embodiments, the interior surfaces 110 of the apparatus 28 may include a material that absorbs, traps and/or dissipates the laser beam 64 so as to restrict reflected laser energy from leaving the interior 104 of the apparatus 28. For example, in embodiments, the material may be: dark or black matte paint; dark or black anodized portions of the surfaces 110; square, hexagonal and/or other shaped baffles that provide a texture, e.g., waffle, to trap reflections; and/or a liquid, a solid and/or a gel substance which is intentionally vaporized while absorbing laser energy.

Additionally, while the foregoing embodiments depicted removal of the substance 18 from the exterior surface 46 of the tube 12, it is to be understood that in other embodiments, the system 10 may be operative to remove a substance from the interior surface 44 of the tube 12. In such embodiments, the laser 14 may be disposed on a pole/arm that is placed inside of the tube 12 and the actuator 16 may be operative to move either the laser 14 or the tube 12.

Finally, it is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, the system 10 may include at least one processor and system memory/data storage structures, which may include random access memory (RAM) and read-only memory (ROM). The at least one processor of the system 10 may include one or more conventional microprocessors and one or more supplementary co-processors such as math co-processors or the like. The data storage structures discussed herein may include an appropriate combination of magnetic, optical and/or semiconductor memory, and may include, for example, RAM, ROM, flash drive, an optical disc such as a compact disc and/or a hard disk or drive.

Additionally, a software application that adapts the controller, i.e., at least one processor, to perform the methods disclosed herein may be read into a main memory of the at least one processor from a computer-readable medium. The term "computer-readable medium", as used herein, refers to any medium that provides or participates in providing instructions to the at least one processor of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random-access memory ("DRAM"), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the methods/processes of the present invention. Therefore, embodiments of the present invention are not limited to any specific combination of hardware and/or software.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for cleaning a tube is provided. The system includes an enclosure, a laser, and an actuator. The enclosure receives the tube. The laser is disposed within the enclosure and operative to ablate a substance disposed on a surface of the tube. The actuator is operative to move the tube relative to the laser. In certain embodiments, the system further includes a probe operative to identify one or more materials that the tube is made of. In certain embodiments, the probe is at least one of: a laser induced breakdown spectroscopy device; and an x-ray fluorescence device. In certain embodiments, the system further includes a sensor operative to measure a wall thickness of the tube. In certain embodiments, the sensor is at least one of: an ultrasonic sensor; an eddy current sensor; a radiological sensor; and; an optical camera. In certain embodiments, the system further includes a sensor operative to measure at least one of: a radius size of the tube; and a length of the tube. In certain embodiments, the system further includes a marking device operative to make one or more marks on the tube that correspond to at least one of: a material that the tube is made of; a wall thickness of the tube; a radius size of the tube; a length of the tube; a manufacturer of the tube; a lot number of the tube; a heat number of the tube; a tracking number of the tube; and an intended use of the tube. In certain embodiments, the substance is at least one of mill scale, oxidation, oil, and a preservative coating. In certain embodiments, movement of the tube relative to the laser is a rotation about a longitudinal axis of the tube. In certain embodiments, the actuator includes at least two drive wheels operative to contact an exterior surface of the tube to effect the rotation of the tube about the longitudinal axis. In certain embodiments, the surface is an exterior surface of the tube. In certain embodiments, the surface is an interior surface of the tube.

Yet another embodiment provides a method for cleaning a tube. The method includes receiving the tube at an enclosure; moving the tube within the enclosure relative to a laser via an actuator, and ablating a substance disposed on a surface of the tube via the laser. In certain embodiments, the method further includes identifying one or more materials that the tube is made of via a probe. In certain embodiments, the probe is at least one of: a laser induced breakdown spectroscopy device; and an x-ray fluorescence device. In certain embodiments, the method further includes measuring a wall thickness of the tube via a sensor. In certain embodiments, the sensor is at least one of: an ultrasonic sensor; an eddy current sensor; a radiological sensor; and an optical camera. In certain embodiments, the method further includes marking the tube with one or more marks that correspond to at least one of: a material that the tube is made of; a wall thickness of the tube; a radius size of the tube; a length of the tube; a manufacturer of the tube; a lot number of the tube; a heat number of the tube; a tracking number of the tube; and an intended use of the tube. In certain embodiments, moving the tube relative to a laser via an actuator includes rotating the tube relative to the laser about a longitudinal axis of the tube.

Still yet another embodiment provides for a system for cleaning a tube. The system includes a laser disposed within an enclosure and operative to ablate a substance disposed on an exterior surface of the tube; and a conveyor having at least two drive wheels operative to effect movement of a point on the exterior surface in a spiral direction relative to the laser so that the laser removes the substance off of a majority of the exterior surface.

Accordingly, by providing for an automated process for cleaning tubes, some embodiments of the present invention may improve the efficiency of a boiler fabrication process. In particular, some embodiments of the present invention provide for a tube cleaning process that does not require end caps to be manually installed and removed from a tube.

Additionally, by utilizing laser ablation to clean a tube, some embodiments of the present invention provide for a method of cleaning a tube that does not require a blasting substance, e.g., granules of metal and/or sand. Thus, some embodiments of the present invention provide for a cleaner and more environmentally friendly process for cleaning a tube.

Further, by utilizing laser ablation in combination with a spiral pattern, as discussed above, some embodiment of the present invention provide for near 100% cleaning and inspection of a tube, representing an improvement over traditional manual inspection and/or systems such as Automatic Tube Verification Systems ("ATVS"), which typically only inspect a single portion of a tube. Accordingly, some embodiments of the present invention may detect thin portions of a tube, cracked portions, or portions having impurities (e.g., sand/dirt), voids, air bubbles, cracks, etc., that may go undetected by traditional inspection systems.

While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for cleaning a tube, comprising:
   an enclosure for receiving the tube;
   a laser disposed within the enclosure and operative to ablate a substance disposed on a surface of the tube;
   a probe disposed within the enclosure adjacent to the laser, wherein the probe is operative to identify one or more materials that the tube is made of after ablation of the tube with the laser, wherein the probe is a laser induced breakdown spectroscopy device configured to direct short laser pulses towards the surface of the tube and receive light emitted from plasma created by the laser pulses contacting the surface of the tube that have distinct spectral peaks indicative of the materials forming the tube, and
   an actuator operative to move the tube towards the laser and the probe while rotating the tube about the longitudinal axis of the tube.

2. The system of claim 1, further comprising:
   a sensor operative to measure a wall thickness of the tube.

3. The system of claim 2, wherein the sensor is at least one of:
   an ultrasonic sensor;
   an eddy current sensor;
   a radiological sensor; and;
   an optical camera.

4. The system of claim 1, further comprising:
   a sensor operative to measure at least one of:
      a radius size of the tube; and
      a length of the tube.

5. The system of claim 1, further comprising:
   a marking device operative to make one or more marks on the tube that correspond to at least one of:
      a material that the tube is made of;
      a wall thickness of the tube;
      a radius size of the tube;
      a length of the tube;
      a manufacturer of the tube;
      a lot number of the tube;
      a heat number of the tube;
      a tracking number of the tube; and
      an intended use of the tube.

6. The system of claim 1, wherein the substance is at least one of mill scale, oxidation, oil, and a preservative coating.

7. The system of claim 1, wherein the actuator comprises:
at least two drive wheels operative to contact an exterior surface of the tube to effect the rotation of the tube about the longitudinal axis.

8. The system of claim 1, wherein the surface is an exterior surface of the tube.

9. The system of claim 1, wherein the surface is an interior surface of the tube.

10. A method for cleaning a tube, comprising:
receiving the tube at an enclosure having a laser disposed within the enclosure that is operative to ablate a substance disposed on a surface of the tube and a probe disposed within the enclosure adjacent to the laser that includes a laser induced breakdown spectroscopy device operative to identify one or more materials that the tube is made of;
moving the tube within the enclosure relative to the laser disposed within the enclosure, via an actuator operative to move the tube towards the laser while rotating the tube about the longitudinal axis of the tube;
ablating a substance disposed on a surface of the tube via the laser while the tube rotates about the longitudinal axis; and
identifying one or more materials that the tube is made of with the laser induced breakdown spectroscopy device after ablation of the tube with the laser while the tube rotates about the longitudinal axis in the enclosure, wherein the laser induced breakdown spectroscopy device directs short laser pulses towards the surface of the tube and receives light emitted from plasma created by the laser pulses contacting the surface of the tube that have distinct spectral peaks indicative of the materials forming the tube.

11. The method of claim 10, further comprising:
measuring a wall thickness of the tube via a sensor.

12. The method of claim 11, wherein the sensor is at least one of:
an ultrasonic sensor;
an eddy current sensor;
a radiological sensor; and
an optical camera.

13. The method of claim 10, further comprising:
marking the tube with one or more marks that correspond to at least one of:
a material that the tube is made of;
a wall thickness of the tube;
a radius size of the tube;
a length of the tube;
a manufacturer of the tube;
a lot number of the tube;
a heat number of the tube;
a tracking number of the tube; and
an intended use of the tube.

14. The system of claim 1, wherein the actuator comprises:
a conveyor having at least two drive wheels operative to effect movement of a point on the exterior surface in a spiral path relative to the laser so that the laser removes the substance off of a majority of the exterior surface.

* * * * *